(12) United States Patent
Fujinuma

(10) Patent No.: US 12,054,833 B2
(45) Date of Patent: Aug. 6, 2024

(54) CATALYST FOR SYNTHESIZING ORGANIC CARBONATE AND METHOD OF PRODUCING THEREOF, ELECTRODE FOR SYNTHESIZING ORGANIC CARBONATE, CELL FOR SYNTHESIZING ORGANIC CARBONATE, METHOD OF PRODUCING ORGANIC CARBONATE, AND SYNTHESIS SYSTEM

(71) Applicant: SEKISUI CHEMICAL CO., LTD., Osaka (JP)

(72) Inventor: Naohiro Fujinuma, Glassboro, NJ (US)

(73) Assignee: SEKISUI CHEMICAL CO., LTD., Osaka (JP)

( * ) Notice: Subject to any disclaimer, the term of this patent is extended or adjusted under 35 U.S.C. 154(b) by 247 days.

(21) Appl. No.: 17/208,099

(22) Filed: Mar. 22, 2021

(65) Prior Publication Data
US 2022/0033979 A1  Feb. 3, 2022

Related U.S. Application Data

(60) Provisional application No. 63/058,036, filed on Jul. 29, 2020.

(51) Int. Cl.
C25B 3/07 (2021.01)
C25B 11/075 (2021.01)

(52) U.S. Cl.
CPC ............. *C25B 3/07* (2021.01); *C25B 11/075* (2021.01)

(58) Field of Classification Search
None
See application file for complete search history.

(56) References Cited

U.S. PATENT DOCUMENTS

| | | | |
|---|---|---|---|
| 4,310,393 A * | 1/1982 | Bell | C25B 3/29 205/439 |
| 9,981,846 B1 * | 5/2018 | Kuku | B01D 53/78 |
| 2013/0302715 A1 | 11/2013 | Horikita et al. | |
| 2016/0099473 A1 | 4/2016 | Zhu et al. | |
| 2019/0292668 A1 | 9/2019 | Fujinuma | |
| 2020/0095692 A1 | 3/2020 | Fujinuma et al. | |

FOREIGN PATENT DOCUMENTS

| | | | | |
|---|---|---|---|---|
| CN | 1103862 | | 6/1995 | |
| CN | 103402633 | | 11/2013 | |
| CN | 103415340 | | 11/2013 | |
| CN | 105247723 | | 1/2016 | |
| CN | 107262091 | | 10/2017 | |
| EP | 532861 B1 | * | 5/1996 | .......... C07C 68/005 |
| JP | 2009-215647 | | 9/2009 | |
| JP | 2012153909 A | * | 8/2012 | ............... C25B 3/02 |
| WO | WO-2011024327 A1 | * | 3/2011 | ............... C25B 3/02 |

OTHER PUBLICATIONS

Wang et al. (Quim. Nova, vol. 38, No. 3, 298-302, 2015) (Year: 2015).*
Machine translation of Yamanaka et al. WO 2011024327 A1 (Year: 2011).*
Machine translation of Kanamura et al. JP 2012153909 A (Year: 2012).*
Figueiredo et al., "Spectro-Electrochemical Examination of the Formation of Dimethyl Carbonate from CO and Methanol at Different Electrode Materials", Journal of the American Chemical Society, 2017, vol. 139, pp. 14693-14698.
Funakawa et al., "Active Control of Methanol Carbonylation Selectivity over Au/Carbon Anode by Electrochemical Potential", J. Phys. Chem. B, 2005, vol. 109, pp. 9140-9147.
Funakawa et al., "High Efficient Electrochemical Carbonylation of Methanol to Dimethyl Carbonate by $Br_2/Br^-$ Mediator System over Pd/C Anode", Journal of The Electrochemical Society, 2006, vol. 153, No. 4, pp. D68-D73.
Zhuang et al., "Dopant-tuned stabilization of intermediates promotes electrosynthesis of valuable C3 products", Nature Communications, 2019, vol. 10, No. 4807, pp. 1-7.
Checkchang et al., "Methanol and its derivatives", Chemical Industry Press, Jun. 2002, 1$^{st}$ edition, p. 369.
Chinese Office Action issued Nov. 24, 2023 in corresponding Chinese Patent Application No. 202180058216.1.
Experimental Inorganic Chemistry, Lewis Peak Editing, Halbine Engineering University Press (Mar. 2014), 1st Edition, pp. 174.
English machine translation of Chinese Office Action issued May 8, 2024 in corresponding Chinese Patent Application No. 202180058216. 1.

* cited by examiner

*Primary Examiner* — Wojciech Haske
(74) *Attorney, Agent, or Firm* — Wenderoth, Lind & Ponack, L.L.P.

(57) ABSTRACT

An organic carbonate synthesis catalyst for electrochemically synthesizing an organic carbonate from carbon monoxide, comprises: an active particle containing a metal element; and a porous carbon supporting the active particle.

13 Claims, 3 Drawing Sheets

CATALYST FOR SYNTHESIZING ORGANIC CARBONATE AND METHOD OF PRODUCING THEREOF, ELECTRODE FOR SYNTHESIZING ORGANIC CARBONATE, CELL FOR SYNTHESIZING ORGANIC CARBONATE, METHOD OF PRODUCING ORGANIC CARBONATE, AND SYNTHESIS SYSTEM

TECHNICAL FIELD

The present invention relates to an organic carbonate synthesis catalyst for electrochemically synthesizing an organic carbonate from carbon monoxide and a method for producing the same, an electrode for synthesizing an organic carbonate, a cell for synthesizing an organic carbonate, a method for producing an organic carbonate, and a synthesis system.

BACKGROUND ART

Organic carbonates are used in various fields such as coating materials, adhesives, electrolyte solutions, raw material of resins. A conventional method for producing organic carbonates uses highly toxic materials such as phosgene and an explosive oxygen mixture gas, and generates highly toxic wastes in many cases. Accordingly, a new synthetic method with a low environmental load has been recently desired in the synthesis of organic carbonates.

In contrast, an electrochemical synthesis method requires no use of highly toxic reactants or a highly explosive oxygen mixture gas, capable of directly utilizing electricity from renewable energy, attracting a lot of attention in recent years. Further, for the purposes of suppressing global warming, replacing fossil fuels, etc., generation of organic substances through an electrochemical reaction by using carbon dioxide or carbon monoxide obtained by reduction of carbon dioxide as raw material has been studied in recent years. Also, regarding organic carbonates, electrochemical synthesis from raw material such as carbon monoxide with use of various catalysts has been attempted (for example, refer to NPL 1 to 4).

CITATION LIST

Non Patent Literature

NPL1: Journal of the Electrochemical Society, 153(4), D68 (2006)
NPL2: J. Phys. Chem. B 2005, 109, 9140-9147
NPL3: J. Am. Chem. Soc. 2017, 139, 14693-14698
NPL4: Nat Commun 10, 4807 (2019)

SUMMARY OF INVENTION

Technical Problem

The conventional method for electrochemically synthesizing an organic carbonate, however, has a low selectivity, so that enhancement of the selectivity through improvement in catalyst is required for practical use.

Accordingly, an object of the present invention is to provide an organic carbonate synthesis catalyst that can electrochemically synthesize an organic carbonate from carbon monoxide with a high selectivity.

Solution to Problem

The present invention provides the following described in items [1] to [16].

[1] An organic carbonate synthesis catalyst for electrochemically synthesizing an organic carbonate from carbon monoxide, comprising: an active particle containing a metal element; and a porous carbon supporting the active particle.

[2] The organic carbonate synthesis catalyst according to item [1], wherein the metal element includes at least one selected from the group consisting of group 8 to group 1.1 elements.

[3] The organic carbonate synthesis catalyst according to item [1] or [2], further comprising a component derived from a nitrogen-containing aromatic compound.

[4] The organic carbonate synthesis catalyst according to item [3], wherein the nitrogen-containing aromatic compound is at least one selected from the group consisting of a pyridine derivative, an imidazole derivative, and a pyrazole derivative.

[5] The organic carbonate synthesis catalyst according to any one of items [1] to [4], obtained by mixing a metal precursor and a porous carbon, and heat-treating the mixture at 150° C. or more and 800° C. or less.

[6] The organic carbonate synthesis catalyst according to any one of items [1] to [4], wherein the metal element includes at least two selected from the group consisting of group 8 to group 11 elements.

[7] An electrode for synthesizing an organic carbonate, comprising the organic carbonate synthesis catalyst according to any one of items [1] to [6].

[8] A cell for synthesizing an organic carbonate, comprising the electrode for synthesizing an organic carbonate according to item [7].

[9] The cell for synthesizing an organic carbonate according to item [8], comprising an electrolyte solution containing a redox species.

[10] The cell for synthesizing an organic carbonate according to item [8] or [9], further comprising: an anode compartment having the electrode for synthesizing an organic carbonate disposed therein, and containing an alcohol-based compound therein, and an inlet port through which carbon monoxide is supplied to the anode compartment.

[11] A method for producing an organic carbonate, comprising electrochemically synthesizing an organic carbonate from carbon monoxide with the organic carbonate synthesis catalyst according to any one of items [1] to [6].

[12] The method for producing an organic carbonate according to item [11], wherein carbon dioxide is converted to the carbon monoxide and the organic carbonate is electrochemically synthesized from the carbon monoxide.

[13] The method for producing an organic carbonate according to item [12], wherein the carbon dioxide is obtained from exhaust gas from any one of a power plant, an ironworks, a cement plant, and a waste incineration plant.

[14] A synthesis system comprising the cell for synthesizing an organic carbonate according to item [10], the synthesis system comprising: a conversion portion that converts carbon dioxide to carbon monoxide; and a supply path that supplies the carbon monoxide obtained in the conversion portion to the anode compartment through the inlet port.

[15] The synthesis system according to item [14], wherein the carbon dioxide is obtained from exhaust gas from any one of a power plant, an ironworks, a cement plant, and a waste incineration plant.

[16] A method for producing an organic carbonate synthesis catalyst, comprising heat-treating a mixture containing a metal precursor and a porous carbon at 150° C. or more and 800° C. or less.

According to the present invention, an organic carbonate is electrochemically synthesized from carbon monoxide with a high selectivity, so that an improved reaction efficiency can be achieved.

DESCRIPTION OF EMBODIMENT

<Catalyst for Synthesizing Organic Carbonate>

Figure 1:
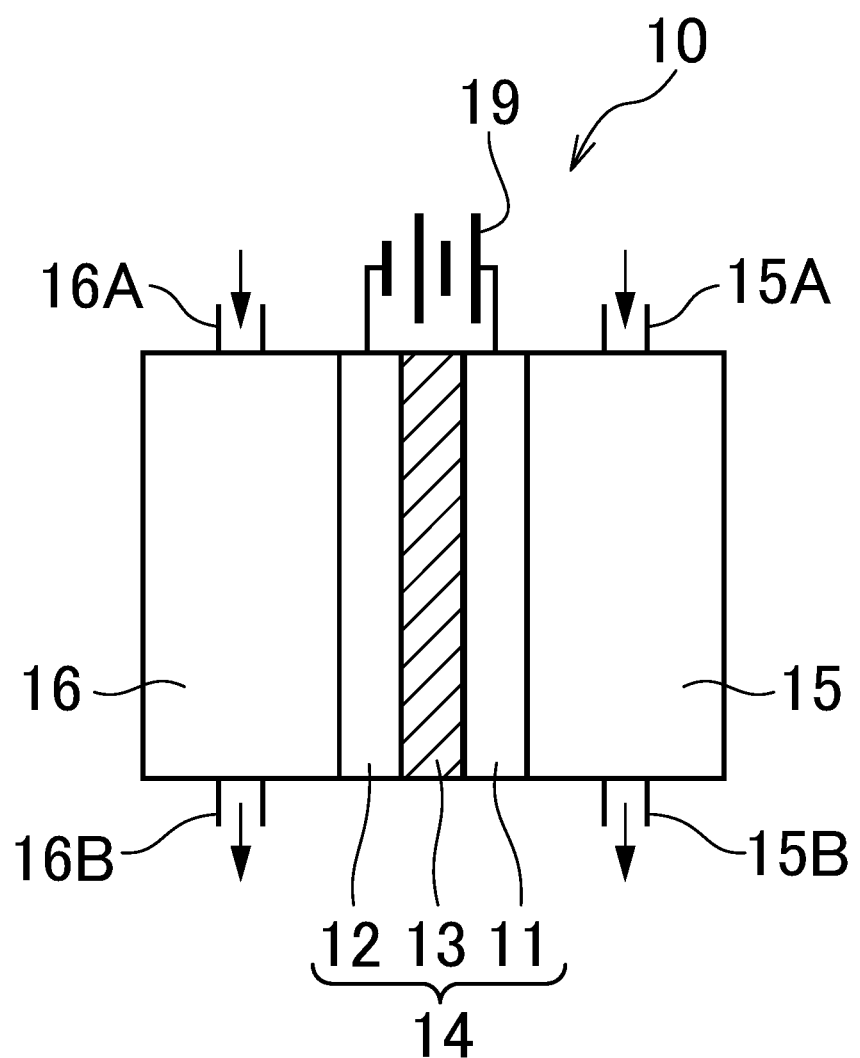
FIG. 1 is a schematic diagram showing a specific example of the cell for synthesizing an organic carbonate of the present invention.

The organic carbonate synthesis catalyst of the present invention (hereinafter, simply referred to as "catalyst" in some cases) is an organic carbonate synthesis catalyst for electrochemically synthesizing an organic carbonate from carbon monoxide, and includes an active particle containing a metal element, and a porous carbon supporting the active particle.

The present invention having the configuration described above enables electrochemical synthesis of an organic carbonate from carbon monoxide with a high selectivity.

In the present invention, the catalyst can be produced by mixing a metal precursor and a porous carbon, and heat-treating the mixture, as described below. The metal precursor is made into the active particle through heat treatment, and the active particle is supported on the surface of the porous carbon.

(Active Particle)

The active particle containing metal element has a catalytic ability for catalyzing reactions in electrochemical synthesis of an organic carbonate from carbon monoxide. The active particle containing metal element may be composed of metal oxide, composed of metal itself, or composed of both of metal oxide and metal.

The metal elements for use in the active particle may be selected from the group consisting of group 8 to group 11 elements, and specific examples thereof include Fe, Co, Ni, Cu, Ru, Rh, Pd, Ag, Os, Ir, Pt, and Au. Among them, Co, Ni, Cu, Rh, Pd, Ag, Ir, Pt and Au are preferred. In particular, Pd, Au, Ni, Cu, and Co are more preferred, and Pd is particularly preferred.

The metal elements for use in the active particle may be used alone or in combination of two or more. In the case of using two or more in combination, two or more metal elements selected from the group consisting of group 8 to group 11 elements may be used in combination, or a metal element from group 8 to group 11 elements and a metal element other than group 8 to group 11 elements may be used in combination. Examples of the metal elements other than group 8 to group 11 elements preferably include a metal element of period 4 elements, though a metal element other than period 4 elements may be used.

Specifically, a combination of Au and at least one selected from the group consisting of Ti, Mn, Fe, Co, Ni, Cu and Zn is preferred. A combination of Pd and at least one selected from the group consisting of Ti, Co, Ni, Cr, Mn, Fe, Cu, Zn, Ru, Rh, Ag, Ir, Pt, Au and Sn is also preferred. Further, a combination of and at least one selected from the group consisting of Au, Rh, and Ru is also preferred.

Such a combination allows the amount of a noble metal used to be suppressed, while maintaining the selectivity high in synthesis of an organic carbonate.

It is preferable that the metal elements for use in the active particle include at least two metal elements selected from the group consisting of group 8 to group 11 elements from the viewpoint of improving the selectivity. In particular, a combination of Pd or Ir and at least one selected from the group consisting of group 8 to group 11 elements other than Pd and Ir is more preferred.

Specifically, a combination of Pd and at least one selected from the group consisting of Ag, Au, Pt, Ir and Cu, or a combination of Ir and one selected from the group consisting of Au, Rh and Ru is more preferred. Accordingly, any one of the combinations of Pd and Ag, Pd and Au, Pd and Pt, Pd and Ir, Pd and Cu, Ir and Au, Ir and Rh, and Ir and Ru, is more preferred. Among these, use of at least Pd is more preferred from the viewpoint of selectivity.

In the case of using two or more metals in combination, the content of each metal may be appropriately determined, and in the case of using Pd, the content of Pd is, for example, 10 to 99 mol %, and preferably 25 to 95 mol % from the viewpoint of selectivity. On the other hand, it is preferable that Pd be combined with at least one selected from the group consisting of Ag, Au, Pt, Ir and Cu ("specific metal other than Pd"), and, in that case, the content of the specific metal other than Pd is, for example, 1 to 90 mol %, preferably 5 to 75 mol %.

In the case of using Ir without combination with Pd, the content of Ir is, for example, 5 to 99 mol %, preferably 1.0 to 95 mol % from the viewpoint of selectivity. On the other hand, it is preferable that Ir be combined with at least one selected from the group consisting of Au, Rh and Ru ("specific metal other than Ir"), and in that case, the content of the specific metal other than Ir is, for example, 1 to 95 mol %, preferably 5 to 90 mol %.

Incidentally, the content of metal referred to here is a ratio relative to the total amount of metals contained in the catalyst.

In the catalyst, the active particle may be in a fine particulate form, and the active particle in a fine particulate form may be supported on a porous carbon. Though not particularly limited, the active particle may be a nano-order particle, having an average particle size of preferably 100 nm or less, more preferably 1 nm or more and 40 nm or less. The nano-structured active particle with the above particle size has an increased active area, so that various performances of the catalyst tend to be improved. Incidentally, the particle size means an equivalent circular area diameter, which is obtained as follows. The area of each particle is obtained from observation of image by TEM-EDX, etc., and the diameter is calculated from the area, with each particle assumed to be a circle.

(Porous Carbon)

The porous carbon contained in the catalyst is a support that supports the above active particle. The support that is porous carbon allows the reactant to appropriately diffuse into the catalyst, so that the selectivity and the reaction efficiency can be easily improved. Though not particularly limited, the porous carbon is preferably a carbon compound in powder or particle form. Accordingly, the catalyst also is preferably in powder or particle form. The catalyst in powder or particle form easily adheres to an electrode base material and tends to have an increased contact area to carbon monoxide, so that the selectivity, the reaction efficiency, etc., in synthesis of an organic carbonate tend to be improved.

The porous carbon has a BET specific surface area of, for example, 10 $m^2/g$ or more and 3000 $m^2/g$ or less, preferably 100 $m^2/g$ or more and 500 $m^2/g$ or less. With a surface area of the porous carbon in the above range, an appropriate amount of the active particle is supported on the porous carbon, so that the catalyst has an appropriate catalytic activity, and the selectivity and the reaction efficiency, etc., tend to be enhanced. The BET specific surface area can be measured by gas adsorption analysis.

The porous carbon has an average primary particle size of, for example, 1 nm or more and 1000 nm or less, preferably 10 nm or more and 300 nm or less. With an average primary particle size of the porous carbon in the above range, the nano-size active particle is appropriately supported on the porous carbon, so that the selectivity and the reaction efficiency, etc., tend to be enhanced. The average primary particle size of the porous carbon can be measured through observation such as electron microscopic observation. Specific examples of the measurement method include obtaining an equivalent circular area diameter by obtaining the area of each particle and calculating the diameter from the area, with each particle assumed to be a circle.

The porous carbon has an average pore size of, for example, 0.5 nm or more and 100 nm or less, preferably 1 nm or more and 50 nm or less. With an average pore size in the above range, the reactant easily diffuses into the catalyst, so that the selectivity and the reaction efficiency, etc., tend to be improved. Incidentally, the average pore size of the porous carbon can be measured by gas adsorption analysis.

The porous carbon is not particularly limited as long as it can support an active particle, but a conductive carbon compound is preferred. Use of a conductive carbon compound in an electrode for synthesizing an organic carbonate allows the electrical conductivity of the electrode to increase, so that the reaction efficiency, etc., tend to be enhanced.

More specifically, examples of the porous carbon include a mesoporous carbon, an activated carbon, a carbon black such as ketjen black and acetylene black, a carbon nanotube, graphite and graphene, and in particular, a carbon black is preferred. The carbon black is more preferably a conductive carbon black.

(Nitrogen-Containing Aromatic Compound)

The catalyst of the present invention may further have a component derived from a nitrogen-containing aromatic compound. A catalyst having a component derived from a nitrogen-containing aromatic compound tends to improve the conversion efficiency, the selectivity, etc., in synthesis of an organic carbonate.

The component derived from a nitrogen-containing aromatic compound has a nitrogen element, and it is preferable that the nitrogen element be coordinated with a metal element constituting the active particle (for example, a metal element constituting metal oxide) to form a metal-nitrogen element bonding through the coordination bond.

It is preferable that the component derived from a nitrogen-containing aromatic compound be supported on a porous carbon. In other words, it is preferable that the component derived from a nitrogen-containing aromatic compound be coordinated with a metal element constituting the active particle and supported on a porous carbon.

It is preferable that the nitrogen-containing aromatic compound have a nitrogen-containing aromatic ring structure with nitrogen contained in an aromatic ring.

In the case where a catalyst contains the component derived from a nitrogen-containing aromatic compound, a mixture of a metal precursor, a porous carbon and a nitrogen-containing aromatic compound is heat-treated to obtain the catalyst. Accordingly, the component derived from a nitrogen-containing aromatic compound is a component that is obtained by heat-treating the nitrogen-containing aromatic compound.

In the present invention, the heat-treating temperature gets lower as described below, so that a nitrogen-containing aromatic ring structure formed from the nitrogen-containing aromatic compound remains in the catalyst. It is preferable that the component derived from the nitrogen-containing aromatic compound in the catalyst has the nitrogen-containing aromatic ring structure.

Examples of the nitrogen-containing aromatic compound include a pyridine derivative, an imidazole derivative, a pyrazole derivative and a triazole derivative. Among them, a pyridine derivative, an imidazole derivative and a pyrazole derivative are preferred. These compounds may be used alone or in combination of two or more.

Accordingly, the catalyst may contain at least one nitrogen-containing aromatic ring structure selected from the group consisting of a pyridine ring structure, an imidazole ring structure, a pyrazole ring structure and a triazole ring structure. In particular, it is preferable that the catalyst contains at least one selected from the group consisting of a pyridine ring structure, an imidazole ring structure and a pyrazole ring structure.

[Pyridine Derivative]

The pyridine derivative for use in the present invention is a compound having a pyridine ring. The pyridine derivative may be a compound having one, two, three or four or more pyridine rings in a molecule.

Examples of the compound having one pyridine ring in a molecule (pyridine monomer) include a compound having at least one functional group such as an amino group (—$NH_2$), an alkyl group and an alkoxy group in the pyridine ring, from the viewpoint of preventing the pyridine derivative from subliming or evaporating in heat-treatment (or in sintering). Examples of the alkyl group include an alkyl group having about 1 to 5 carbon atoms such as a methyl group, an ethyl group, a butyl group and a pentyl group (amyl group). Examples of the alkoxy group include an alkoxy group having about 1 to 4 carbon atoms such as a methoxy group and a butoxy group. Specific examples of the pyridine monomer include an alkyl pyridine such as methyl pyridine, ethyl pyridine, butyl pyridine and pentyl pyridine (amyl pyridine), an alkoxy pyridine such as methoxy pyridine and butoxy pyridine, and an amino pyridine such as 4-amino pyridine.

Among the pyridine monomers described above, amino pyridine is preferred, and 4-amino pyridine is more preferred. Also, ethyl pyridine is preferred as the pyridine monomer.

Examples of the compound having two pyridine rings in a molecule include a compound having a bipyridine skeleton with two pyridine rings directly bonded through a carbon-carbon single bond (bipyridine derivative). As the bipyridine derivative, a bipyridine is preferred and, in particular, 2,2'-bipyridine is more preferred. Also, a bipyridine derivative having an amino group is preferred, and specific examples thereof include diamino bipyridine. In particular, 4,4'-diamino-2,2'-bipyridine is more preferred.

Examples of the compound having three pyridine rings in a molecule include a compound having a terpyridine skeleton with three pyridine rings directly bonded through carbon-carbon single bonds (terpyridine derivative). Examples of the terpyridine derivative include a terpyridine.

Examples of the compound having four or more pyridine rings in a molecule include a pyridine oligomer having four or more pyridine rings, with a weight-average molecular weight of less than 10000. Examples of the pyridine oligomer include a compound having a polypyridine skeleton with pyridine rings directly bonded each other through carbon-carbon single bonds. Suitable specific examples thereof include a polypyridine. Examples of the polypyridine include poly(2,5-pyridine) and poly(3,5-pyridine), and, in particular, poly(2,5-pyridine) is more preferred.

Incidentally, the molecular weight of the polypyridine such as poly(2,5-pyridine) is not particularly limited, and the weight-average molecular weight is preferably 500 or more and 8,000 or less, preferably 1,000 or more and 6,000 or less, more preferably 1,500 or more and 5,000 or less.

Examples of the pyridine derivative include a polymer having a plurality of pyridine rings in a molecule, with a weight-average molecular weight of 10,000 or more. In this case, it is preferable that the pyridine derivative has four or more pyridine rings in a molecule. As the specific compound, a polyvinyl pyridine, i.e., a polymer of vinyl pyridine, is preferred, and, in particular, poly(4-vinyl pyridine) is more preferred.

It is preferable for a polyvinyl pyridine such as poly(4-vinyl pyridine) to have a molecular weight more than a specified value from the viewpoints of the conversion efficiency, the selectivity, etc. The weight-average molecular weight is, for example, 1,000 or more, 10,000 or more, preferably 30,000 or more, still more preferably 50,000 or more. From the viewpoints of availability, etc., the weight-average molecular weight is, for example, 200,000 or less, preferably 100,000 or less.

Incidentally, the weight-average molecular weight is a value measured by gel permeation chromatography (GPC), in which polystyrene may be used as reference material. More specific measurement method is as described below.

Among the pyridine derivative described above, 4-amino pyridine, 2,2'-bipyridine, poly(2,5-pyridine) and poly(4-vinyl pyridine) having a weight-average molecular weight of 10,000 or more are more preferred. Also, 4,4'-diamino-2,2'-bipyridine is preferred.

Further, among the pyridine derivatives described above, use of poly(4-vinyl pyridine) and poly(2,5-pyridine) are particularly preferred, and poly(4-vinyl pyridine) is most preferred.

The pyridine derivatives may be used alone or in combination of two or more.

[Imidazole Derivative]

The imidazole derivative for use in the present invention is a compound having an imidazole ring. The imidazole derivative may be a compound having one, two, or three or more imidazole rings in a molecule.

Examples of the compound having one imidazole in a molecule (imidazole monomer) include a compound with an imidazole having at least one functional group such as an amino group (—NH$_2$), an alkyl group, an alkoxy group, a halogen group, an aryl group, and an aralkyl group, from the viewpoint of preventing the imidazole derivative from subliming or evaporating in heat-treatment (or in sintering). The compound may have a heterocyclic structure including an imidazole ring. The specific examples of the alkyl group and the alkoxy group are as described regarding the pyridine monomer. Examples of the aryl group include a phenyl group and a tolyl group, and examples of the aralkyl group include a benzyl group and a phenethyl group.

Specific examples of the imidazole monomer include 1-methyl imidazole, 1-ethyl imidazole, 1-propyl imidazole, 1-isopropyl imidazole, 1-butyl imidazole, 1-phenethyl imidazole, 2-methyl imidazole, 2-ethyl imidazole, 2-propyl imidazole, 2-isopropyl imidazole, 2-butyl imidazole, 2-phenyl imidazole, 4-methyl imidazole, 4-ethyl imidazole, 4-propyl imidazole, 4-isopropyl imidazole, 4-butyl imidazole, 4-phenyl imidazole, benzoimidazole, 1-methyl benzoimidazole, and bifonazole.

Examples of the compound having two imidazole rings in a molecule include a compound having an imidazole skeleton with two imidazole rings directly bonded through a carbon-carbon single bond (biimidazole derivative). Examples of the imidazole derivative include biimidazole.

Further, as the compound having a plurality of imidazole rings in a molecule, a polyvinyl imidazole, i.e., a polymer of vinyl imidazole, is preferred. In particular, poly(4-vinyl imidazole) and poly(N-vinyl imidazole) are more preferred, and poly(4-vinyl imidazole) is still more preferred.

From the viewpoints of the conversion efficiency, the selectivity, etc., it is preferable that the polyvinyl imidazole such as poly(4-vinyl imidazole) has a molecular weight more than a specified value. The weight-average molecular weight is, for example, 1,000 or more, preferably 10,000 or more, and from the viewpoints of availability, etc., for example, 200,000 or less, preferably 100,000 or less.

The imidazole derivatives may be used alone or in combination or two or more.

[Pyrazole Derivative]

The pyrazole derivative for use in the present invention is a compound having a pyrazole ring. The pyrazole derivative may be a compound having one, two, or three or more pyrazole rings in a molecule.

Examples of the compound having one pyrazole ring in a molecule (pyrazole monomer) include a compound with the pyrazole ring having at least one functional group such as an amino group (—NH$_2$), an alkyl group, an alkoxy group, an aryl group and an aralkyl group, from the viewpoint of preventing the pyrazole derivative from subliming or evaporating in sintering (or in heat treatment). Specific examples of the alkyl group and the alkoxy group are as described regarding the pyridine monomer. Specific examples of the aryl group and the aralkyl group are as described regarding the imidazole monomer.

Specific examples of the pyrazole include 1-methyl pyrazole, 1-ethyl pyrazole, 1-propyl pyrazole, 1-isopropyl pyrazole, 1-butyl pyrazole, 1-phenethyl pyrazole, 3-methyl pyrazole, 3-ethyl pyrazole, 3-propyl pyrazole, 3-isopropyl pyrazole, 3-butyl pyrazole, 3-phenyl pyrazole, 1,3-dimethyl pyrazole, 1,3-diethyl pyrazole, 1,3-dipropyl pyrazole, 1,3-isopropyl pyrazole, 1,3-dibutyl pyrazole, and 1,3-diphenethyl pyrazole.

The pyrazole derivatives may be used alone or in combination of two or more.

[Triazole Derivative]

The triazole derivative for use in the present invention is a compound having a triazole ring. The triazole derivative may be a compound having one, two, or three or more triazole rings in a molecule.

Examples of the compound having one triazole ring in a molecule (triazole monomer) include a compound with the triazole ring having at least one functional group such as an amino group (—NH$_2$), an alkyl group, and an alkoxy group, from the viewpoint of preventing the triazole derivative from subliming or evaporating in sintering (or in heat treatment). Specific examples of the alkyl group and the alkoxy group are as described regarding the pyridine monomer.

Examples of the compound having two triazole rings in a molecule include a compound having a bitriazole skeleton with two triazole rings directly bonded through a carbon-carbon single bond (bitriazole derivative). Examples of the bitriazole derivative include bitriazole.

Further, as the compound having a plurality of triazole rings in a molecule, a polyvinyl triazole, i.e., a polymer of vinyl triazole, is preferred, and in particular, poly(1-vinyl-1,2,4-triazole) is more preferred.

From the viewpoints of the conversion efficiency, the selectivity, etc., it is preferable that the polyvinyl triazole such as poly(1-vinyl-1,2,4-triazole) has a molecular weight more than a specified value. The weight-average molecular weight is, for example, 1,000 or more, preferably 10,000 or more. From the viewpoints of availability, etc., the weight-average molecular weight is, for example, 200,000 or less, preferably 100,000 or less.

The triazole derivative may be used alone or in combination of two or more.

(Method for Producing Catalyst)

The method for producing the catalyst is described as follows. The catalyst described above can be obtained by mixing a metal precursor and a porous carbon and heat-treating the mixture containing the metal precursor and the porous carbon (hereinafter referred to as "raw material mixture for catalyst"). In the case where the catalyst contains a component derived from a nitrogen-containing aromatic compound, it is preferable that the nitrogen-containing aromatic compound be further mixed with the metal precursor and the porous carbon such that the raw material mixture for catalyst contains the metal precursor, the porous carbon and the nitrogen-containing aromatic compound.

The metal precursor is a compound to make into the active particle described above through heat treatment. Accordingly, it is preferable that the metal precursor be a precursor having metal element selected from the group consisting of group 8 to group 11 elements described above, and the preferable metal elements are as described above. The metal elements for use in the metal precursor may be used alone or in combination of two or more.

In the case where two or more are used in combination, it is preferable that two or more precursors having metal elements selected from the group consisting of group 8 to group 11 elements be used in combination, or a precursor having a metal element selected from the group consisting of group 8 to group 11 elements and a precursor having a metal element other than group 8 to group 11 elements (for example, a metal element of period 4) be used in combination.

Incidentally, in the case where two or more metal precursors are used in combination, it is preferable that the catalyst be obtained by mixing the two or more metal precursors with a porous carbon and heat-treating the mixture. Accordingly, it is preferable that two or more metal precursors be contained in the raw material mixture for catalyst.

It is preferable that the metal precursor contain metal ions. Further, it is preferable the metal precursor be used, for example, in a form of metal salt. Examples of the metal salt include a metal nitrate, a metal sulfate, a metal chloride, a metal bromide, a metal iodide and a metal acetate. Among them, a metal chloride and a metal nitrate are preferred, and from the viewpoint of forming an appropriate active particle, a metal nitrate is more preferred. Specific examples thereof include cobalt nitrate ($Co(NO_3)_2$), nickel nitrate ($Ni(NO_2)$), copper nitrate ($Cu(NO_3)_2$), rhodium nitrate ($Rh(NO_3)_3$), palladium nitrate ($Pd(NO_3)_2$), silver nitrate ($Ag)NO_3$), iridium nitrate ($Ir(NO_3)_4$), platinum nitrate ($Pt(NO_3)_4$), gold nitrate ($AuNO_3$), ruthenium nitrate ($Ru(NO_3)_3$), iron nitrate ($Fe(NO_3)_3$), manganese nitrate ($Mn(NO_3)_2$), zinc nitrate ($Zn(NO_3)_2$), chromium nitrate ($Cr(NO_3)_3$), and tin nitrate ($Sn(NO_3)_4$). Further, specific examples of the metal chloride include $RuCl_3$, $IrCl_3$, $PtCl_4$ and $AuCl_3$. Further, $HAuCl_4$ or the like may be also included.

The metal salts may be used alone or in combination of two or more as described above. In other words, the metal precursor includes preferably one or more selected from the group consisting of a nitrate ion, a sulfate ion, a chloride ion, a bromide ion, an iodide ion, and a hydroxide ion, more preferably a nitrate ion, in particular. Further, the metal salt may be a hydrate.

The porous carbon and the nitrogen-containing aromatic compound for use as raw material in the present production method are as described above.

The content of metal derived from the above metal precursor in the raw material mixture for catalyst based on the total amount of the raw material mixture for catalyst is preferably 0.1 mass % or more and 70 mass % or less, more preferably 2 mass % or more and 50 mass % or less. With the content in the above range, the metal is contained in the catalyst without aggregation, so that an appropriate amount of catalytic active points is formed. Accordingly, the selectivity in synthesis of an organic carbonate tends to be enhanced, and the reaction efficiency is also enhanced.

The content of the porous carbon in the raw material mixture for catalyst based on the total amount of the raw material mixture for catalyst is not particularly limited, being, for example, 10 mass % or more and 95 mass % or less, preferably 20 mass % or more and 85 mass % or less, still more preferably 30 mass % or more and 80 mass % or less. With a content of the porous carbon in the above range, the active particle and the component derived from a nitrogen-containing aromatic compound can be appropriately supported, with the catalytic activity being well maintained.

In the case of using a nitrogen-containing aromatic compound, it is preferable that the amount of the nitrogen-containing aromatic compound compounded in the raw material mixture for catalyst be adjusted such that the molar ratio of the nitrogen-containing aromatic ring in the nitrogen-containing aromatic compound relative to the metal element derived from the above metal precursor (nitrogen-containing aromatic ring/metal element) is 0.1 or more and 30 or less. With an amount adjusted in the above range, the nitrogen element in an appropriate amount can be coordinated with the metal of the active particle while reducing occurrence of a side reaction. Accordingly, the selectivity, the conversion efficiency, etc., tend to be enhanced in synthesis of an organic carbonate. The above molar ratio is more preferably 1 or more and 20 or less. Incidentally, the above molar ratio represents a ratio between the number of nitrogen-containing aromatic rings contained in the nitrogen-containing aromatic compound and the number of moles of metal elements contained in the metal precursor.

The temperature in heat treatment of the raw material mixture for catalyst is preferably 150° C. or more and 800° C. or less. With a heat treatment temperature controlled in the above range, the raw material mixture for catalyst can be appropriately sintered while preventing unnecessary by-products from being produced. As a result, an active particle is formed from the metal precursor, and the active particle is appropriately supported with the porous carbon. Further, migration of the active particle is prevented, so that particle size of the active particle can be reduced, and the surface area of the catalyst can be easily increased. In the case where the raw material mixture for catalyst contains a nitrogen-containing aromatic compound, the nitrogen contained in the nitrogen-containing aromatic compound can be coordinated with the metal of the active particle, and the component derived from the nitrogen-containing aromatic compound can be appropriately supported on the porous carbon. Further, by lowering the heat treatment temperature as described above, the nitrogen-containing aromatic ring structure of the nitrogen-containing aromatic compound tends to be maintained in the catalyst to be produced.

From the viewpoint described above, the heat treatment temperature is preferably 180° C. or more and 550° C. or less, more preferably 200° C. or more and 380° C. or less.

The heat treatment time is not particularly limited, being, for example, 0.25 hours or more and 10 hours or less, preferably 0.5 hours or more and 8 hours or less, still more preferably 1 hour or more and 5 hours or less.

Further, the above heat treatment may be performed under an atmosphere of inert gas such as argon and nitrogen gas, or under a reducing atmosphere of hydrogen or the like.

The raw material mixture for catalyst to be heat treated is preferably in a powder or particle form. The raw material mixture for catalyst in a powder or particle form enables a catalyst being in a powder or particle form to be produced through heat treatment. The raw material mixture for catalyst to be heat treated more preferably consists of a metal precursor and a porous carbon, or consists of a metal precursor, a porous carbon and a nitrogen-containing aromatic compound.

The raw material mixture for catalyst may be obtained, for example, by preparing a diluent of the raw material mixture for catalyst of a metal precursor, a nitrogen-containing aromatic compound and a porous carbon diluted with a diluent solvent, and drying the diluent.

Further, in the diluent of the raw material mixture for catalyst, it is preferable that each of the components (the metal precursor and the porous carbon, or the metal precursor, the nitrogen-containing aromatic compound and the porous carbon) be dispersed or dissolved in the diluent solvent. With each of the components dispersed or dissolved in the diluent solvent, a raw material mixture for catalyst with each of the components uniformly mixed can be obtained.

As the diluent solvent for use in dilution of the raw material mixture for catalyst, water or an organic solvent can be used. Examples of the organic solvent include an ester-based solvent, a ketone-based solvent, an ether-based solvent, an alcohol-based solvent, glycol ethers, an amide-based solvent, a nitrile-based solvent, a carbonate-based solvent, a halogenated hydrocarbon, a hydrocarbon, a sulfone-based solvent, sulfoxides, and formamide, though not particularly limited. Further, a mixture solvent of an organic solvent and water may be used as the diluent solvent. The concentration of the diluent of the raw material mixture for catalyst is not particularly limited, being, for example, 0.01 g/L or more and 25 or less, preferably 0.1 g/L or more and 5 g/L or less.

<Electrode for Synthesis of Organic Carbonate>

The electrode for synthesizing an organic carbonate of the present invention is an electrode having the catalyst described above. The electrode for synthesizing an organic carbonate is an electrode for use in electrochemically synthesizing an organic carbonate from carbon monoxide. The electrode for synthesizing an organic carbonate constitutes an anode.

The electrode for synthesizing an organic carbonate has, for example, an electrode base material, and the catalyst produced in advance as described above may be adhered to the electrode base material. In a typical case, the catalyst adhered to the electrode base material is physically fixed to the electrode base material, and atoms constituting the electrode base material have no chemical bonding with atoms constituting the catalyst. Accordingly, even in the case where the electrode base material itself contains a carbon compound, the carbon compound itself has no metal-nitrogen element bonding. Further, the carbon compound itself has no metal-carbon element bonding. In this context, the carbon element is a carbon element constituting a carbon compound such as porous carbon, and the metal is a metal derived from the metal precursor.

Furthermore, the above catalyst may be adhered to the electrode base material together with a fluorine compound such as perfluoroethylene sulfonic acid ("Nafion" as commercial product, trademark of DuPont), polytetrafluoroethylene (PTFE), tetrafluoroethylene oligomer (TFEO), fluorinated graphite ((CF)n), and fluorinated pitch (FP). In other words, the catalyst may be mixed with a fluorine compound so as to adhere the mixture (catalyst composition) to an electrode base material. The fluorine compound is used as a water repellent, and improves the efficiency of electrochemical reaction. Further, the fluorine compound functions also as a binder for adhering a catalyst to an electrode base material. Further, the fluorine compound functions as an ion conductor to improve the efficiency of electrochemical reaction. The fluorine compounds may be used alone or in combination of two or more. It is preferable that the fluorine compound be perfluoroethylene sulfonic acid.

In an electrode for synthesizing an organic carbonate, the catalyst (or catalyst composition) may be formed into a layer as catalyst layer on the surface of the electrode base material, by application of a coating liquid containing the catalyst as described below. Also, a part or the whole of the catalyst layer may be formed such that the internal part of an electrode base material is impregnated with the catalyst over a part or the whole of the thickness direction. For example, the catalyst layer may be formed from the surface to the internal part of the electrode base material. Incidentally, the catalyst layer may appropriately have voids.

(Electrode Base Material)

The electrode base material is not particularly limited, and examples thereof include a carbon base material, a metal base material and a metal oxide base material, and it preferably has conductivity. Also, the base material may be a porous material. The base material constitutes an electrode, and may be, for example, in a sheet form, a plate form, etc.

Among those described above, a carbon base material is preferred, and a porous carbon is more preferred. Specific examples of the porous carbon include a carbon nonwoven fabric. The carbon nonwoven fabric is not particularly limited, and a known carbon nonwoven fabric may be used. For example, a commercial product such as carbon nonwoven fabric for fuel cells may be used, and examples thereof include a carbon paper "Torayca" (registered trademark) manufactured by Toray Industries, Inc., "AvCarb 1071HCB" manufactured by New Metals and Chemicals Corporation, Ltd., and BC series manufactured by SOL Carbon Japan Co., Ltd.

Further, examples of the metal base material include a metal mesh, and examples of the metal used therefor include gold, silver, platinum, nickel, titanium, chromium and so on. Further, examples of the metal oxide used for the metal oxide base material include indium oxide, tin oxide, tin-doped iridium oxide and fluorine-doped tin oxide.

Further, the electrode for synthesizing an organic carbonate may constitute a laminated assembly together with an ion exchange membrane and a second electrode (cathode) described below. The laminated assembly may include the electrode for synthesizing an organic carbonate, the ion exchange membrane and the second electrode in this order. In the laminated assembly, the electrode for synthesizing an organic carbonate (anode) and the second electrode (cathode) may be joined through the ion exchange membrane to constitute a membrane electrode assembly described below.

(Method for Producing Electrode for Synthesizing Organic Carbonate)

The electrode for synthesizing an organic carbonate may be produced by preparing a catalyst in advance and adhering the prepared catalyst to an electrode base material. The catalyst may be mixed with a component other than catalyst such as a fluorine compound, and the mixture (catalyst composition) may be adhered to the electrode base material.

The method for adhering the catalyst to the electrode base material is not particularly limited, and examples thereof include a method including applying a diluent of a catalyst, and a component other than the catalyst such as fluorine compound added thereto on an as needed basis, diluted with a diluent solvent, to an electrode base material, and drying the applied diluent; and a method including immersing an electrode base material in the above diluent and drying the diluent.

The method for applying a diluent to an electrode base material may be any method without particular limitation, and application may be performed by using various types of coating devices or by spray coating. Further, the method for immersing an electrode base material in a diluent is not particularly limited, and the electrode base material may be immersed in the diluent prepared in advance. The whole of the electrode base material may be immersed in the diluent, or a part of the electrode base material may be immersed in the diluent.

Further, the above diluent is preferably a dispersion with a catalyst or a catalyst and a component other than the catalyst dispersed in a diluent solvent, and as the diluent solvent, water or an organic solvent may be used. The organic solvent is as described above, and it is preferable to use an alcohol-based solvent, a ketone-based solvent, a nitrile-based solvent or the like. A mixture solution of an organic solvent and water may also be used.

<Cell for Synthesizing Organic Carbonate>

The cell for synthesizing an organic carbonate of the present invention includes the electrode for synthesizing an organic carbonate described above. A cell for synthesizing an organic carbonate 10 in an embodiment of the present invention is described as follows with reference to FIG. 1, though the electrode for synthesizing an organic carbonate 10 is not limited to the structure in FIG. 1.

(Anode Compartment)

As shown in FIG. 1, the cell for synthesizing an organic carbonate 10 includes an anode compartment 15 having an electrode for synthesizing an organic carbonate (anode 11) disposed therein.

The anode compartment 15 is provided with an inlet port 15A, through which carbon monoxide is supplied. Incidentally, the inlet port 15A for supplying carbon monoxide to the anode compartment 15A is referred to as a first inlet port in some cases. Carbon monoxide is supplied in a gas form.

To the inlet port 15A, a supply path such as piping is connected. To the anode compartment 15, a carbon monoxide supply source not shown in drawing is connected through the supply path, and from the carbon monoxide supply source or the like, carbon monoxide is supplied thereto. In the supply path, a flow rate control mechanism may be disposed to control the flow rate of carbon monoxide supplied.

The carbon monoxide may be continuously supplied to the anode compartment 15, or may be intermittently supplied. The carbon monoxide alone may be supplied to the anode compartment 15, or the carbon monoxide may be supplied to the anode compartment 15 with an inert gas such as helium as carrier gas. Further, the carbon monoxide may be supplied together with carbon dioxide, etc.

The anode compartment 15 may be provided with an outlet port 15B for discharging a produced material, an unreacted reactant, carbon monoxide, etc.

Carbon monoxide may be supplied, with bubbling or the like, to a filling liquid (alcohol-based compound, mixed liquid, electrolyte solution or the like) described below with which the anode compartment 15 is filled. The carbon monoxide may be reacted with an alcohol-based compound in the anode compartment 15 while at least a part of the carbon monoxide is dissolved in the filling liquid in the anode compartment 15.

An alcohol-based compound as reactant is contained in the anode compartment 15. The alcohol-based compound may be any one of a solid, a liquid or a gas under environment where an electrochemical reaction is performed in the anode compartment 15, being preferably a liquid. It is preferable that the anode compartment 15 be filled with the alcohol-based compound in a liquid state.

Further, in the case where the alcohol-based compound is a solid or a gas, or in the case where improvement in dissolvability of the electrolyte salt or redox species described below is required, it is preferable that the reactant (alcohol-based compound) be made into liquid mixed with a solvent (hereinafter, referred to simply as "mixed liquid" in some cases) in the anode compartment, so as to fill the anode compartment 15. Of course, the alcohol-based compound that is liquid may be made into a mixed liquid with a solvent for filling incidentally, the inside of the anode compartment 15 may be wholly filled with the alcohol-based compound or the mixed liquid, or may have a partial space. The alcohol-based compound, the solvent, etc., may be supplied to the anode compartment 15 through the first inlet port 15, or may be supplied to the anode compartment 15 through another inlet port (not shown in drawing).

(Alcohol-Based Compound)

The alcohol-based compound of the present invention is a reactant for producing an organic carbonate through a reaction with carbon monoxide in the anode compartment 15. The alcohol-based compound is a compound having at least one hydroxyl group, more specifically a compound represented by the following general formula (1).

Incidentally, in the present specification, the term "alcohol-based compound" includes an aromatic hydroxy compound with a hydroxyl group directly bonded to an aromatic ring such as benzene ring, which is typified by phenol, as described below:

$$ROH \tag{1}$$

wherein R represents an organic group having 1 to 15 carbon atoms.

Examples of the organic group having 1 to 15 carbon atoms represented by R in the above general formula (1) include a hydrocarbon group having 1 to 15 carbon atoms. Examples of the hydrocarbon group include an alkyl group having 1 to 15 carbon atoms or an alkenyl group having 2 to 15 carbon atoms, and an aryl group having 6 to 15 carbon atoms.

Examples of the alkyl group having 1 to 15 carbon atoms include a methyl group, an ethyl group, various propyl groups, various butyl groups, various pentyl groups, various hexyl groups, various heptyl groups, various octyl groups, various nonyl groups, various decyl groups, various dodecyl groups, and various pentadecyl groups.

Examples of the alkenyl group having 2 to 15 carbon atoms include a vinyl group, various propynyl groups, various butynyl groups, various pentynyl groups, various hexenyl groups, various heptenyl groups, various octenyl groups, various nonenyl groups, various decenyl groups, various dodecenyl groups, and various pentadecenyl groups.

Incidentally, the term "various" means various isomers including n-, sec-, tert-, and iso-. Further, the alkyl group or the alkenyl group may be in any one of a straight chain form, a branched chain form, or a ring form.

Examples of the aryl group having 6 to 15 carbon atoms include a phenyl group and a naphthyl group. Incidentally, the hydrocarbon groups described above may have a substituent, and in that case, the number of carbon atoms including that of the substituent is 1 to 15.

Further, the organic group having 1 to 15 carbon atoms in the general formula (1) may contain a hetero atom such as a nitrogen atom, an oxygen atom, a sulfur atom, a phosphorus atom, and a halogen atom.

Among them, an oxygen atom is preferred. In the case of having an oxygen atom, it is preferable that the oxygen atom be an oxygen atom of an alcohol group or an ether bond. Accordingly, R is preferably a hydrocarbon group having at least one of a hydroxyl group and an ether bond. Further, it is preferable that R have one hydroxyl group. Thus, the alcohol-based compound may have two hydroxyl groups.

More specifically, as the alcohol-based compound having two hydroxyl groups, a group represented by the following formula (1-1) is preferred:

$$HO-R^{11}-OH \quad (1\text{-}1)$$

In the formula (1-1), $R^{11}$ is a divalent saturated hydrocarbon group having 2 to 15 carbon atoms, and $R^{11}$ has preferably 2 to 4 carbon atoms, more preferably 2 to 3 carbon atoms.

As the compound represented by the above general formula (1), among the ones described above, R is preferably an alkyl group having 1 to 8 carbon atoms, an alkenyl group having 2 to 8 carbon atoms, or an aryl group having 6 to 8 carbon atoms. Ones represented by the general formula (1-1), wherein $R^{11}$ has 2 to 4 carbon atoms, are also preferred.

Among them, a compound of which R is an alkyl group or an aryl group is more preferred, and in particular, a compound of which R is an alkyl group is still more preferred. The alkyl group has preferably 1 to 3 carbon atoms, more preferably 1 or 2 carbon atoms, still more preferably one carbon atom.

Specifically, from the viewpoints of the reactivity, the production efficiency, etc., methanol, ethanol, phenol, 1-propanol, ethylene glycol, and propylene glycol are preferred, and in particular, methanol is more preferred.

Further, the alcohol-based compounds may be used alone or in combination of two or more.

The reaction performed in the anode compartment 15 is a carbonylation reaction through which an organic carbonate is produced from carbon monoxide and an alcohol-based compound. Specifically, an organic carbonate ($(RO)_2CO$) is produced through a reaction shown in the following formula (i).

$$CO + 2ROH \rightarrow (RO)_2CO + 2H^+ + 2e^- \quad (i)$$

R in (i) is as described above, and preferably an alkyl group having 1 to 8 carbon atoms, an alkenyl group having 2 to 8 carbon atoms, or an aryl group having 6 to 8 carbon atoms, more preferably an alkyl group or an aryl group, still more preferably an alkyl group. The alkyl group has more preferably 1 to 3 carbon atoms, still more preferably 1 or 2 carbon atoms, most preferably 1 carbon atom.

Further, in the case where ROH is represented by the general formula (1-1), an organic carbonate is produced by the reaction represented by the following (ii).

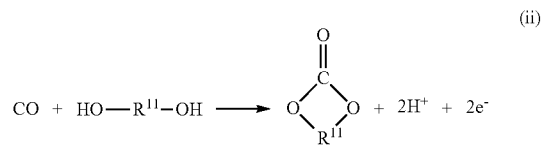

$R^{11}$ in (ii) is as described above, and $R^{11}$ has preferably 2 to 4 carbon atoms, more preferably 2 to 3 carbon atoms.

Specifically, preferred examples of the organic carbonate include one or two or more selected from the group consisting of dimethyl carbonate, diethyl carbonate, ethylene carbonate, dipropyl carbonate, propylene carbonate, diphenyl carbonate, ethyl methyl carbonate, methyl propyl carbonate, and ethyl propyl carbonate, and in particular, dimethyl carbonate is more preferred.

As the solvent that may be used with the alcohol-based compound in the anode compartment 15, a solvent usually used in electrochemical reactions may be selected, and examples thereof include a nitrile-based solvent such as acetonitrile, a carbonate-based solvent such as ethylene carbonate, propylene carbonate, butylene carbonate, vinylene carbonate, dimethyl carbonate, ethyl methyl carbonate, and diethyl carbonate, a lactone-based solvent such as γ-butyrolactone, an ether-based solvent such as 1,2-dimethoxy ethane, 1-ethoxy-2-methoxy ethane, 1,2-diethoxy ethane, tetrahydrofuran, and 2-methyltetrahydrofuran, a phosphate ester solvent, phosphoric acids, a sulfolane-based solvent, and pyrrolidones. These solvents may be used alone or in combination of two or more.

It is preferable that an electrolyte salt be added to the alcohol-based compound or mixed liquid that is the filling liquid in the inside of the anode compartment, from the viewpoint of improving the electrochemical reaction efficiency. In that case, the alcohol-based compound or mixed liquid itself functions as the electrolyte solution.

The filling liquid in the inside of the anode compartment may contain a redox species, which is used as electrolyte salt. In other words, the cell for synthesizing an organic carbonate 10 may contain an electrolyte solution containing a redox species in the inside of the anode compartment 15. It is preferable that the electrolyte solution contains an alcohol-based compound. In an embodiment of the present invention, since an alcohol-based compound having a larger molecular size than that of typical redox species may be used as reactant, the diffusion rate of the alcohol-based compound might be assumed to determine the reaction rate. However, electron transfer between the catalyst and the reactant is facilitated by the redox species, so that the selectivity and the reaction efficiency, etc., can be improved.

As the redox species, one having redox activity with a smaller molecular or ion size than that of the alcohol-based compound can be used. Examples of the redox species include a halogenated metal salt and an organic redox. Specific examples thereof include a halogenated lithium salt such as lithium chloride, lithium bromide and lithium iodide, a halogenated sodium salt such as sodium chloride, sodium bromide and sodium iodide, a halogenated potassium salt such as potassium chloride, potassium bromide and potassium iodide, a halogenated cesium salt such as cesium chloride, cesium bromide and cesium iodide, and a halogenated ammonium such as ammonium chloride, ammonium bromide and ammonium iodide.

Further, examples of the organic redox include 2,2,6,6-tetramethyl piperidine 1-oxyl (TEMPO), palladium acetylacetonato ($Pd(OAC)_2$), tetrakis(triphenyl phosphine)palladium ($Pd(PPh_3)_4$ complex), tris(2,2'-bipyridine)cobalt (Co (bpy)$_3$ complex), and tris[1,3-bis(4-pyridyl)propane)]cobalt (Co(bpp)$_3$ complex). Among them, a metal bromide salt is preferred, and a halogenated lithium salt is also preferred. In particular, lithium bromide is more preferred.

The electrolyte salt contained in the filling liquid in the inside of the anode compartment may be other than the redox species described above, and, for example, a halogen acid salt may be used. Accordingly, the cell for synthesizing an organic carbonate 10 may contain an electrolyte solution containing a halogen acid salt in the inside of the anode compartment 15. It is preferable that this electrolyte solution may contain an alcohol-based compound. Examples of the halogen acid salt include a perchlorate such as sodium perchlorate ($NaClO_4$), zinc perchlorate, barium perchlorate, lithium perchlorate, and ammonium perchlorate, sodium sulfate, potassium sulfate, and ammonium sulfate. These electrolyte salts may be used alone or in combination of two or more.

The concentration of the electrolyte salt in the filling liquid is, for example, in the range of 0.001 mol/L or more and 2 mol/L or less, preferably 0.01 mol/L or more and 1 mol/L or less.

(Cathode Compartment)

It is preferable that, the cell for synthesizing an organic carbonate 10 be provided with a cathode compartment 16 having a cathode 12 disposed therein, in addition to the anode compartment 15. The cathode compartment 16 is a region where an introduced reducible material is electrochemically reduced. The reducible material may be carbon dioxide or any compound that can be reduced at the cathode 12 side, and examples thereof include water, CO, $N_2$ or proton. The cathode compartment 16 may be filled with a reducible material or an electrolyte solution. The electrolyte solution may contain a reducible material.

The cathode 12 is not particularly limited, and may have a reducing catalyst that catalyzes reduction. For example, the reducing catalyst may be attached to the electrode base material. It is preferable that the reducing catalyst be a carbon dioxide-reducing catalyst that catalyzes the reduction for reducing carbon dioxide into carbon monoxide. The cathode 12 may have no reducing catalyst, and may be composed of electrode base material. Incidentally, the details of the electrode material are as described above.

It is preferable that the cathode compartment 16 be provided with a second inlet port 16A for supplying the reducible material or the like and a second outlet port 16B for discharging a product reduced in the cathode compartment 16 and the unreduced reducible material.

(Ion Exchange Membrane)

The cell for synthesizing an organic carbonate 10 is further provided with an ion exchange membrane 13. The ion exchange membrane 13 constitutes a diaphragm for separating the anode compartment 15 and the cathode compartment 16. Incidentally, in an embodiment shown in FIG. 1, the cathode 12 and the anode 11 are disposed at both sides of the ion exchange membrane 13, respectively, and joined to the ion exchange membrane 13 to constitute a membrane electrode assembly 14. As the ion exchange membrane 13, a solid membrane is used, and examples thereof include a cation exchange membrane which cations such as protons can pass through and an anion exchange membrane which anions such as hydroxide ions can pass through.

Examples of the cation exchange membrane include ones having at least any one of functional groups such as a sulfonyl group, a carboxyl group, a phosphate group, and a silicate group. Examples of the cation exchange membrane having a sulfonyl group as functional group include hydrocarbon resin-based polysulfonic acids such as polyethylene sulfonic acid and fullerene cross-linked polysulfonic acid, and fluorine resin-based polysulfonic acids such as perfluoroethylene sulfonic acid. Examples of the perfluoroethylene sulfonic acid include a copolymer of tetrafluoroethylene and perfluoro[2-(fluorosulfonylethoxy)propyl vinyl ether]. Examples of commercial product thereof include "Nation" (trademark of DuPont).

Examples of the ones having a carboxyl group as functional group include polycarboxylic acids such as a polyacrylic acid. As the ones having a phosphate group or a silicate group, heteropolyacids such as silicotungstic acid and phosphotungstic acid may be used. Further, as the cation exchange membrane, phosphate glasses such as $SiO_2$—$P_2O_5$ and ceramics such as perovskite-type oxide may be used.

Examples of the anion exchange membrane include a resin or polyethers having a quaternary ammonium salt such as poly(styryl methyl trimethyl ammonium chloride), and a polymer having an imidazolium group. Examples of the resin having an ammonium salt include "FAA-3-50" manufactured by FuMA-Tech GmbH and "TM1 Durion Grade" manufactured by Orion Corp. Examples of the polymer having an imidazolium include a styrene polymer having an imidazolium group, and specific examples thereof include a copolymer of styrene and 1-(p-vinylbenzyl)-3-methylimidazolium (PSMIM), a copolymer of styrene and 1-(p-vinylbenzyl)-tetramethyl-imidazolium (PSTMIM), and a copolymer of styrene and 1-(p-vinylbenzyl)-2,3-dimethyl-imidazolium (PSDMIM).

In the present embodiment, cations such as protons are generated at the anode 11, and the cations are sent to the cathode 12 side through the ion exchange membrane 13. Accordingly, it is preferable to use a cation exchange membrane as the ion exchange membrane 13.

A power source 19 is connected to the anode 11 and the cathode 12, and a voltage is applied between the anode 11 and the cathode 12. In the anode compartment 15, carbon monoxide introduced through the first inlet port 15A and the alcohol-based compound in the anode compartment 15 are electrochemically reacted to produce an organic carbonate. Further, in the cathode compartment 16, a reducible material is reduced at the cathode 12 to produce a reduced material.

The cell for synthesizing an organic carbonate of the present invention is not limited to the structure described above, as long as it is provided with the electrode for synthesizing an organic carbonate. For example, in the above description, the cathode 12 and the anode 11 are joined to both sides of the ion exchange membrane 13, respectively, to constitute a membrane electrode assembly together with the ion exchange membrane 13. However, the cell may have another structure without constituting the membrane electrode assembly or without joining the ion exchange membrane 13 and the electrode.

Figure 2:
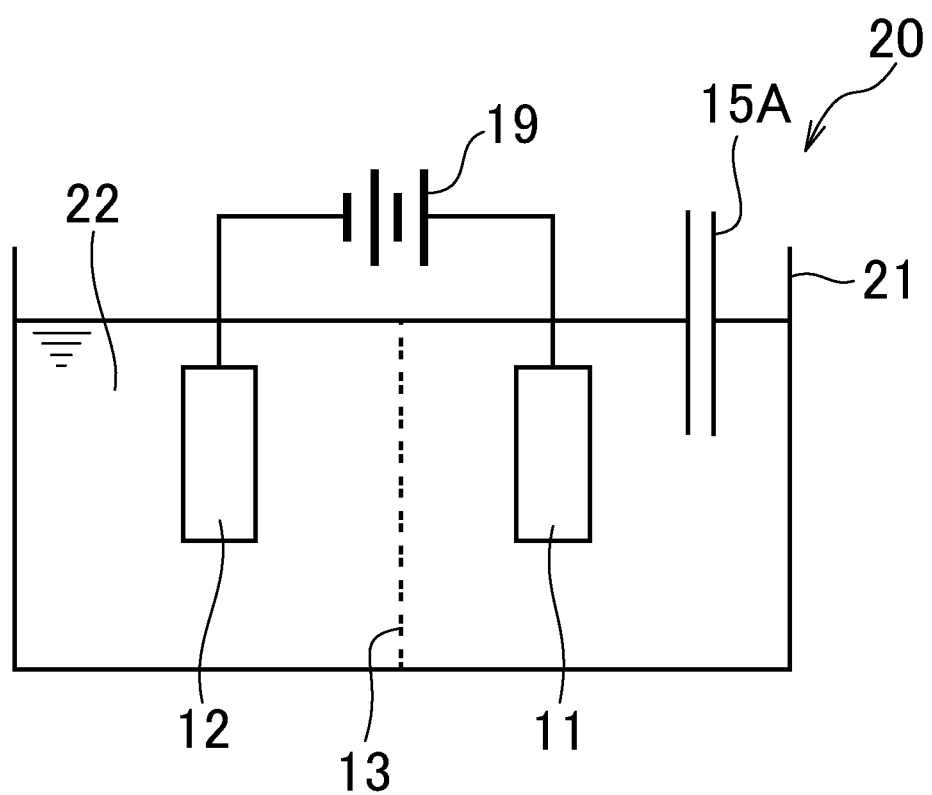
FIG. 2 is a schematic diagram showing another specific example of the cell for synthesizing an organic carbonate of the present invention.

FIG. 2 shows a cell for synthesizing an organic carbonate 20 having another structure. The cell for synthesizing an organic carbonate 20 includes an electrochemical bath 21 of which inside is filled with an electrolyte solution 22. In the electrolyte solution 22, an anode 11 and a cathode 12 are disposed. The anode 11 and the cathode 12, however, are not necessarily required to be disposed in the electrolyte solution 22, as long as the contact with the electrolyte solution 22 is secured.

In the inside of the electrochemical bath 21, an ion exchange membrane 13 is disposed, and the electrolyte solution 22 is divided into a region at the anode 11 side (anode compartment) and a region at the cathode 12 side (cathode compartment) by the ion exchange membrane 13. In the cell for synthesizing an organic carbonate 20, the anode 11, the cathode 12 and the ion exchange membrane 13 are disposed, separated from each other.

The electrolyte solution 22 contains preferably an alcohol-based compound, and may further contain, a solvent, an electrolyte salt, a redox species, etc. on an as needed basis. Incidentally, the electrolyte solution 22 may be the same in the anode compartment and the cathode compartment, but not required to be the same. The electrolyte solution in the anode compartment and the electrolyte solution in the cathode compartment may be different as long as the electrolyte solution 22 to fill the inside of the anode compartment contains an alcohol-based compound.

The cell for synthesizing an organic carbonate 20 is provided with a first inlet port 15A, and an end of the first inlet port 15A is disposed in the electrolyte solution 22 in the region at the anode 11 side. Further, the cell for synthesizing an organic carbonate 20 may be provided with a reference electrode or the like disposed in the electrolyte solution 22 in the region at the anode 11 or cathode 12 side. A voltage is applied between the cathode 12 and the anode 11 by a power source 19.

The cell for synthesizing an organic carbonate 20 having such a structure also allows to obtain an organic carbonate through synthesis from carbon monoxide introduced from the inlet, port 15A and the alcohol-based compound contained in the electrolyte solution in the region at the anode 11 side. At the cathode 12, a reducible material in the electrolyte solution 22 and a reducible material introduced into the region at the cathode 12 side from the second inlet port not shown in drawing may be reduced. In the case where the reducible material is in a gas state, the reducible material may be blown into the electrolyte solution 22 at the cathode 12 side from the second inlet port not shown in drawing.

Of course, the cells for synthesizing an organic carbonate 10 and 20 described above are merely examples of cells for synthesizing an organic carbonate, and the cell for synthesizing an organic carbonate of the present invention is not limited to the structure described above. For example, the ion exchange membrane may be omitted from the cell for synthesizing an organic carbonate 20 having the structure shown in FIG. 2. Alternatively, for example, the voltage may be applied by photoelectromotive force.

[Synthesis System]

The present invention also provides a synthesis system having the cell for synthesizing an organic carbonate. It is preferable that the synthesis system comprise: a conversion portion that converts carbon dioxide into carbon monoxide; and a supply path that supplies the carbon monoxide obtained in the conversion portion to the anode compartment. The present synthesis system allows an organic carbonate to be synthesized from carbon dioxide, so that the amount of carbon dioxide emissions can be reduced, and global warming can be prevented.

Further, it is preferable that the carbon dioxide be obtained from exhaust gas from any one of a power plant, an ironworks, a cement plant, and a waste incineration plant. In these facilities, a large amount of exhaust gas containing carbon dioxide is generated, and therefore, use of the exhaust gas generated from these facilities as raw material easily enables to efficiently and practically produce an organic carbonate.

Figure 3:
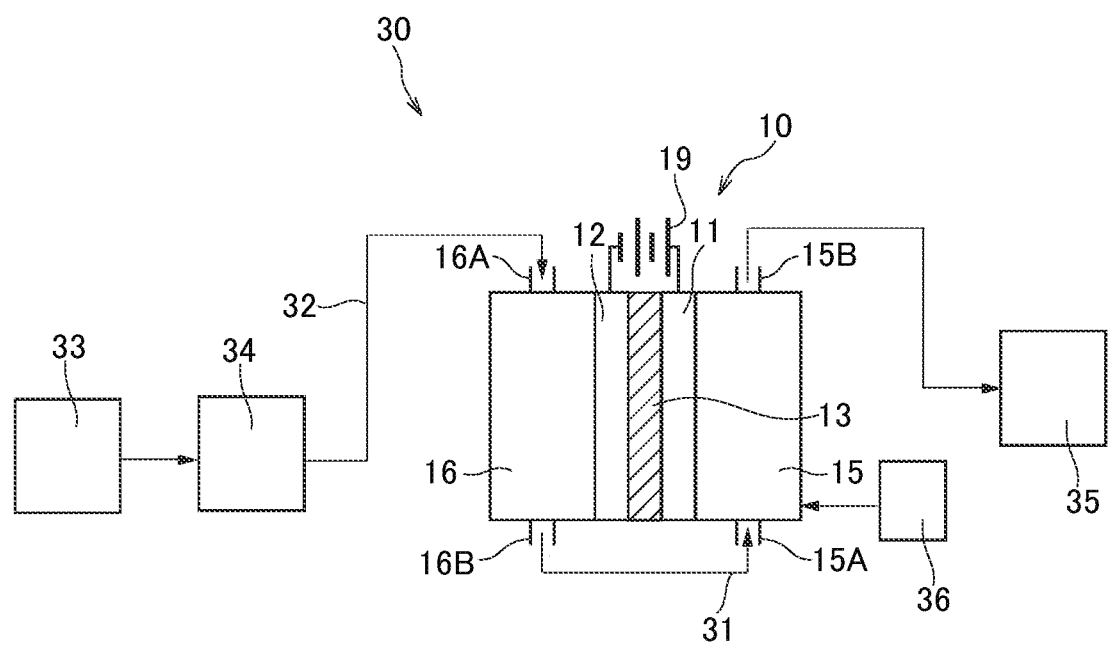
FIG. 3 is a schematic diagram showing an embodiment of the synthesis system of the present invention.

In FIG. 3, an embodiment of the present synthesis system is shown. In the following, with reference to FIG. 3, the synthesis system of the present invention and the method for synthesizing an organic carbonate from carbon dioxide are described in more details.

As shown in FIG. 3, a synthesis system 30 is provided with a cell for synthesizing an organic carbonate 10, and as described above, in an anode compartment 15 of the cell for synthesizing an organic carbonate 10, an organic carbonate is synthesized from carbon monoxide and an alcohol-based compound.

Further, it is preferable that a cathode compartment 16 function as a conversion portion that converts carbon dioxide into carbon monoxide, and accordingly, the cathode 12 contain a carbon dioxide-reducing catalyst for reducing carbon dioxide to carbon monoxide.

Further, the synthesis system 30 may be provided with a supply path 31 that connects the cathode compartment 16 to the anode compartment 15 (first supply path 31), and the first supply path 31 may supply the carbon monoxide obtained in the cathode compartment 16 (conversion portion) to the anode compartment 15 through a first inlet port 15A.

Further, the synthesis system 30 may have a carbon dioxide supply source 33. The carbon dioxide supply source 33 is not particularly limited as long as it can supply a carbon dioxide-containing gas to the cathode compartment 16 (conversion portion), being preferably any one of a power plant, an ironworks, a cement plant, and a waste incineration plant. In these facilities, a large amount of exhaust gas is generated, and in general, the gas contains carbon dioxide. Accordingly, it is preferable to supply the exhaust gas generated from these facilities to the cell for synthesizing an organic carbonate 10. Also, the carbon dioxide-containing gas supplied from the carbon dioxide supply source 33 may be supplied to the cathode compartment 16 from the second inlet port 16A through the second supply path 32.

The synthesis system 30 may be further provided with a carbon dioxide refining apparatus 34. The carbon dioxide refining apparatus 34 is an apparatus that increases the carbon dioxide concentration in the supply gas supplied from a carbon dioxide supply source 33 through refinement of the carbon dioxide-containing gas such as exhaust gas. In other words, it is preferable that the carbon dioxide-containing gas generated in the carbon dioxide supply source 33 be subject to increase in the carbon dioxide concentration in the carbon dioxide refining apparatus 34 before supply to the cathode compartment 16 (conversion portion) through the second supply path 32. Due to having the carbon dioxide refining apparatus 34, carbon monoxide is efficiently produced in the cathode compartment 16 (conversion portion), so that an organic carbonate also can be produced at high efficiency in the anode compartment 15.

Specific examples of the carbon dioxide refining apparatus 34 include chemical adsorption with use of an amine compound and physical adsorption.

Further, the synthesis system 30 may be provided with a purification apparatus or the like not shown in drawing other than the carbon dioxide refining apparatus 34. The purification apparatus may remove impurities from the carbon dioxide-containing gas supplied from the carbon dioxide supply source 33, so as to supply the gas with impurities removed to the cathode compartment 16 (conversion portion). Examples of the purification apparatus include various filters and a washing tower.

The synthesis system 30 may be further provided with a carbonate refining apparatus 35, an alcohol-based compound supply source 36, etc. The carbonate refining apparatus 35 is an apparatus that refines the organic carbonate produced in the cell for synthesizing an organic carbonate 10 and discharged from the outlet port 15B. Examples of the carbonate refining apparatus 35 include a distillation tower and a column portion.

The alcohol-based compound supply source 36 is a tank, container or the like that holds the alcohol-based compound. The alcohol-based compound may be supplied to the anode compartment 15 from the alcohol-based compound supply source 36.

The synthesis system 30 described above merely shows an embodiment for producing an organic carbonate by using the organic carbonate synthesis catalyst of the present invention. The synthesis system may have any structure as long as the effect of the present invention is not impaired, and, for example, the carbon dioxide refining apparatus 34, the carbonate refining apparatus 35, etc., may be appropriately omitted.

Although an embodiment with use of the cathode compartment 16 as the conversion portion that converts carbon dioxide into carbon monoxide is shown, one other than the cathode compartment 16 may be used as the conversion portion. For example, in an electrolytic cell other than the cell for synthesizing an organic carbonate 10, carbon dioxide may be converted into carbon monoxide.

Further, in the synthesis system 30, the cell for synthesizing an organic carbonate needs not be the cell for synthesizing an organic carbonates 10 having a membrane electrode assembly, and may be the cell for synthesizing an organic carbonate 20 shown in FIG. 2.

EXAMPLES

The present invention is described in more details with reference to Examples, though the present invention is not limited thereto.

Example 1

After dispersing 60 mg of $Pd(NO_3)_2 \cdot 2H_2O$ (manufactured by Sigma-Aldrich. Co. LLC.) and 60 mg of ketjen black (product name "EC-300J", available from Fuel Cell Store, BET specific surface area: 800 m²/g, average primary particle size: 40 nm) in 50 ml of ion exchange water, the dispersion was dried and heated at 300° C. for 1 hour to obtain an organic carbonate synthesis catalyst.

Subsequently, 8 mg of the resulting organic carbonate synthesis catalyst was mixed with 400 μl of isopropyl alcohol together with 20 μl of 10 mass % Nafion solution. The mixture was applied to a carbon paper (product name "Sigracet 29 BC", manufactured by SGL Carbon), and dried at 120° C. for 30 minutes to make an electrode for synthesizing an organic carbonate.

Subsequently, in the first electrolysis compartment (anode compartment) of a two-compartment diaphragm-type electrolytic cell, an electrode for a synthesizing organic carbonate and a reference electrode composed of Ag/AgCl were disposed, and in the second electrolysis compartment (cathode compartment), a counter electrode composed of Pt was set. The first electrolysis compartment and the second electrolysis compartment were separated with Nafion as ion exchange membrane, and then the first electrolysis compartment was filled with a methanol solution of 0.2 M $NaClO_4$. The second electrolysis compartment also was filled with a methanol solution of 0.2 M $NaClO_4$. CO (1 atm) was supplied to the first electrolysis compartment, and a voltage of +1 V was applied between the electrodes to cause a reaction. Subsequently, the components of the reaction solution were analyzed by gas chromatography to calculate the selectivity through comparison with the current value. The results are shown in Table 1.

Example 2

After dispersing 1.10 mg of $Fe(NO_3)_3 \cdot 9H_2O$ (manufactured by Sigma-Aldrich. Co. LLC.) and 60 mg of ketjen black in 50 ml of ion exchange water, the dispersion was dried and heated at 300° C. for 1 hour to obtain an organic carbonate synthesis catalyst. The procedures were then performed in the same manner as in Example 1 to calculate the selectivity. The results are shown in Table 1. Incidentally, in Examples 2 to 14, the same ketjen black was used as in Example 1.

Example 3

After dispersing 75 mg of $Co(NO_3)_2 \cdot 6H_2O$ (manufactured by Sigma-Aldrich Co. LLC.) and 60 mg of ketjen black in 50 ml of ion exchange water, the dispersion was dried and heated at 300° C. for 1 hour to obtain an organic carbonate synthesis catalyst. The procedures were then performed in the same manner as in Example 1 to calculate the selectivity. The results are shown in Table 1.

Example 4

After dispersing 75 mg of $Ni(NO_3)_2 \cdot 6H_2O$ (manufactured by Sigma-Aldrich Co, LLC.) and 60 mg of ketjen black in 50 ml of ion exchange water, the dispersion was dried and heated at 300° C. for 1 hour to obtain an organic carbonate synthesis catalyst. The procedures were then performed in the same manner as in Example 1 to calculate the selectivity. The results are shown in Table 1.

Example 5

After dispersing 45 mg of $Cu(NO_3)_2$ hydrate (manufactured by Sigma-Aldrich Co. LLC.) and 60 mg of ketjen black in 50 ml of ion exchange water, the dispersion was dried and heated at 300° C. for 1 hour to obtain an organic carbonate synthesis catalyst. The procedures were then performed in the same manner as in Example 1 to calculate the selectivity. The results are shown in Table 1.

Example 6

After dispersing 40 mg of $RuCl_3 \cdot 3H_2O$ (manufactured by Sigma-Aldrich Co. LLC.) and 60 mg of ketjen black in 50 ml of ion exchange water, the dispersion was dried and heated at 300° C. for 1 hour to obtain an organic carbonate synthesis catalyst. The procedures were then performed in the same manner as in Example 1 to calculate the selectivity. The results are shown in Table 1.

Example 7

After dispersing 40 mg of $Rh(NO_3)_3$ hydrate (manufactured by Sigma-Aldrich Co. LLC.) and 60 mg of ketjen black in 50 ml of ion exchange water, the dispersion was dried and heated at 300° C. for 1 hour to obtain an organic carbonate synthesis catalyst. The procedures then were performed in the same manner as in Example 1 to calculate the selectivity. The results are shown in Table 1.

Example 8

After dispersing 24 mg of $AgNO_3$ (manufactured by Sigma-Aldrich Co. LLC.) and 60 mg of ketjen black in 50 ml of ion exchange water, the dispersion was dried and heated at 300° C. for 1 hour to obtain an organic carbonate synthesis catalyst. The procedures were then performed in the same manner as in Example 1 to calculate the selectivity. The results are shown in Table 1.

Example 9

After dispersing 24 mg of $IrCl_3$ (manufactured by Sigma-Aldrich Co. LLC.) and 60 mg of ketjen black in 50 ml of ion exchange water, the dispersion was dried and heated at 300° C. for 1 hour to obtain an organic carbonate synthesis catalyst. The procedures were then performed in the same manner as in Example 1 to calculate the selectivity. The results are shown in Table 1.

Example 10

After dispersing 26 mg of $PtCl_4$ (manufactured by Sigma-Aldrich Co. LLC.) and 60 mg of ketjen black in 50 ml of ion exchange water, the dispersion was dried and heated at 300° C. for 1 hour to obtain an organic carbonate synthesis catalyst. The procedures were then performed in the same manner as in Example 1 to calculate the selectivity. The results are shown in Table 1,

Example 11

After dispersing 24 mg of $AuCl_3$ (manufactured by Sigma-Aldrich. Co. LLC.) and 60 mg of ketjen black in 50 ml of ion exchange water, the dispersion was dried and heated at 300° C. for 1 hour to obtain an organic carbonate synthesis catalyst. The procedures were then performed in the same manner as in Example 1 to calculate the selectivity. The results are shown in Table 1.

Example 12

The procedures were performed in the same manner as in Example 1, except that the first electrolysis compartment was filled with a phenol solution of 0.2 M $NaClO_4$ containing 50 vol % oaf acetonitrile.

Example 13

The procedures were performed in the same manner as in Example 1, except that the first electrolysis compartment was filled with an ethylene glycol solution of 0.2 M $NaClO_4$.

Example 14

The procedures were performed in the same manner as in Example 1, except that the first electrolysis compartment was filled with a propylene glycol solution of 0.2 M $NaClO_4$.

Example 15

The procedures were performed in the same manner as in Example 1, except that the first electrolysis compartment was filled with methanol of 0.2 M LiBr.

Example 16

The procedures were performed in the same manner as in Example 11, except that the first electrolysis compartment was filled with methanol of 0.2 M LiBr.

Example 17

After dispersing 81 mg of $Pd(NO_3)_2 \cdot 2H_2O$ (manufactured by Sigma-Aldrich Co. LLC.), 13 mg of $AgNO_3$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 18

After dispersing 50 mg of $Pd(NO_3)_2 \cdot 2H_2O$ (manufactured by Sigma-Aldrich. Co. LLC.), 32 mg of $AgNO_3$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 19

After dispersing 68 mg of $Pd(NO_3)_2 \cdot 2H_2O$ (manufactured by Sigma-Aldrich Co. LLC.), 25 mg of $HAuCl_4 \cdot 3H_2O$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1,

Example 20

After dispersing 35 mg of $Pd(NO_3)_2 \cdot 2H_2O$ (manufactured by Sigma-Aldrich Co. LLC.), 51 mg of $HAuCl_4 \cdot 3H_2O$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 21

After dispersing 70 mg of $Pd(NO_3)_2 \cdot 2H_2O$ (manufactured by Sigma-Aldrich. Co. LLC.), 22 mg of $PtCl_4$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 22

After dispersing 36 mg of $Pd(NO_3)_2 \cdot 2H_2O$ (manufactured by Sigma-Aldrich Co. LLC.), 46 mg of $PtCl_4$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 23

After dispersing 86 mg of $Pd(NO_3)_2 \cdot 2H_2O$ (manufactured by Sigma-Aldrich Co. LLC.), 20 mg of $Cu(NO_3)_2 \cdot 3H_2O$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 24

After dispersing 65 mg of $Pd(NO_3)_2 \cdot 2H_2O$ (manufactured by Sigma-Aldrich Co. LLC.), 58 mg of $Cu(NO_3)_2 \cdot 3H_2O$ (manufactured by Sigma-Aldrich. Co, LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 25

After dispersing 70 mg of $Pd(NO_3)_2 \cdot 2H_2O$ (manufactured by Sigma-Aldrich Co, LLC.), 20 mg of $Ir(III)Cl_3$ (manufactured by Sigma-Aldrich. Co, LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 26

After dispersing 36 mg of $Pd(NO_3)_2 \cdot 2H_2O$ (manufactured by Sigma-Aldrich. Co. LLC.), 40 mg of $Ir(III)Cl_3$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 27

After dispersing 50 mg of $Ir(III)Cl_3$ (manufactured by Sigma-Aldrich Co. LLC.), 16 mg of $HAuCl_4 \cdot 3H_2O$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 28

After dispersing 31 mg of $Ir(III)Cl_3$ (manufactured by Sigma-Aldrich Co. LLC.), 40 mg of $HAuCl_4 \cdot 3H_2O$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 29

After dispersing 55 mg of $Ir(III)Cl_3$ (manufactured by Sigma-Aldrich Co. LLC.), 14 mg of $Rh(NO_3)_3 \cdot xH_2O$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 30

After dispersing 40 mg of $Ir(III)Cl_3$ (manufactured by Sigma-Aldrich Co. LLC.), 40 mg of $Rh(NO_3)_3 \cdot xH_2O$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 31

After dispersing 42 mg of $Ir(III)Cl_3$ (manufactured by Sigma-Aldrich Co. LLC.), 36 mg of $RuCl_3 \cdot 3H_2O$ (manufactured by Sigma-Aldrich Co. LLC.), and 60 mg of ketjen black in 50 ml of ion exchange water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 32

After dispersing 41 mg of $Ir(III)Cl_3$ (manufactured by Sigma-Aldrich Co. LLC.), 36 mg of $RuCl_3 \cdot 3H_2O$ (manufactured by Sigma-Aldrich Co. LLC.), and 60 mg of ketjen black in 50 ml of ion exchange, water, the dispersion was dried and heated at 300° C. for 2 hours to obtain an organic carbonate synthesis catalyst. The procedures were then performed in the same manner as in Example 1 to calculate the selectivity. The results are shown in Table 1.

Example 33

The procedures were performed in the same manner as in Example 17, except that the first electrolysis compartment was filled with methanol of 0.2 M LiBr.

Example 34

The procedures were performed in the same manner as in Example 18, except that the first electrolysis compartment was filled with methanol of 0.2 M LiBr.

Example 35

The procedures were performed in the same manner as in Example 19, except that the first electrolysis compartment was filled with methanol of 0.2 M LiBr.

Example 36

The procedures were performed in the same manner as in Example 20, except that the first electrolysis compartment was filled with methanol of 0.2 M. LiBr.

Example 37

The procedures were performed in the same manner as in Example 17 to calculate the selectivity, except that the first electrolysis compartment was filled with a phenol solution of 0.2 M $NaClO_4$ containing 50 vol % of acetonitrile. The results are shown in Table 1.

Example 38

The procedures were performed in the same manner as in Example 18 to calculate the selectivity, except that the first electrolysis compartment was filled with a phenol solution of 0.2 M $NaClO_4$ containing 50 vol % of acetonitrile. The results are shown in Table 1.

Example 39

The procedures were performed in the same manner as in Example 19 to calculate the selectivity, except that the first electrolysis compartment was filled with a phenol solution of 0.2 M $NaClO_4$ containing 50 vol % of acetonitrile. The results are shown in Table 1.

Example 40

The procedures were performed in the same manner as in Example 20 to calculate the selectivity, except that the first electrolysis compartment was filled with a phenol solution of 0.2 M $NaClO_4$ containing 50 vol % of acetonitrile. The results are shown in Table 1.

Comparative Example 1

The procedures were performed in the same manner as in Example 1 to calculate the selectivity, except that a commercially available Au electrode (manufactured by Bioanalytical Systems, Inc.) was used as the electrode for synthesizing an organic carbonate. The results are shown in Table 1. Incidentally, the same ketjen black and carbon paper as in Example 1 were used in Comparative Examples 1 and 2.

Comparative Example 2

The procedures were performed in the same manner as in Example 1 to calculate the selectivity, except that a commercially available Pd electrode (manufactured by Bioanalytical Systems, Inc.) was used as the electrode for synthesizing an organic carbonate. The results are shown in Table 1.

TABLE 1

| | Catalyst | Compound | Electrolyte salt (Redox species) | Selectivity (%) |
|---|---|---|---|---|
| Example 1 | Pd/C | Dimethyl carbonate | $NaClO_4$ | 68 |
| Example 2 | Fe/C | Dimethyl carbonate | $NaClO_4$ | 45 |
| Example 3 | Co/C | Dimethyl carbonate | $NaClO_4$ | 43 |
| Example 4 | Ni/C | Dimethyl carbonate | $NaClO_4$ | 26 |
| Example 5 | Cu/C | Dimethyl carbonate | $NaClO_4$ | 38 |
| Example 6 | Ru/C | Dimethyl carbonate | $NaClO_4$ | 51 |
| Example 7 | Rh/C | Dimethyl carbonate | $NaClO_4$ | 52 |
| Example 8 | Ag/C | Dimethyl carbonate | $NaClO_4$ | 43 |
| Example 9 | Ir/C | Dimethyl carbonate | $NaClO_4$ | 49 |
| Example 10 | Pt/C | Dimethyl carbonate | $NaClO_4$ | 31 |
| Example 11 | Au/C | Dimethyl carbonate | $NaClO_4$ | 55 |
| Example 12 | Pd/C | Diphenyl carbonate | $NaClO_4$ | 61 |
| Example 13 | Pd/C | Ethylene carbonate | $NaClO_4$ | 55 |
| Example 14 | Pd/C | Propylene carbonate | $NaClO_4$ | 52 |
| Example 15 | Pd/C | Dimethyl carbonate | LiBr | 60 |
| Example 16 | Au/C | Dimethyl carbonate | LiBr | 48 |
| Example 17 | $Pd_{80}Ag_{20}$/C | Dimethyl carbonate | $NaClO_4$ | 76 |
| Example 18 | $Pd_{50}Ag_{50}$/C | Dimethyl carbonate | $NaClO_4$ | 82 |
| Example 19 | $Pd_{80}Au_{20}$/C | Dimethyl carbonate | $NaClO_4$ | 80 |
| Example 20 | $Pd_{50}Au_{50}$/C | Dimethyl carbonate | $NaClO_4$ | 90 |
| Example 21 | $Pd_{80}Pt_{20}$/C | Dimethyl carbonate | $NaClO_4$ | 72 |
| Example 22 | $Pd_{50}Pt_{50}$/C | Dimethyl carbonate | $NaClO_4$ | 75 |
| Example 23 | $Pd_{80}Cu_{20}$/C | Dimethyl carbonate | $NaClO_4$ | 76 |
| Example 24 | $Pd_{50}Cu_{50}$/C | Dimethyl carbonate | $NaClO_4$ | 82 |
| Example 25 | $Pd_{80}Ir_{20}$/C | Dimethyl carbonate | $NaClO_4$ | 73 |
| Example 26 | $Pd_{50}Ir_{50}$/C | Dimethyl carbonate | $NaClO_4$ | 76 |
| Example 27 | $Ir_{20}Au_{80}$/C | Dimethyl carbonate | $NaClO_4$ | 65 |
| Example 28 | $Ir_{50}Au_{50}$/C | Dimethyl carbonate | $NaClO_4$ | 68 |
| Example 29 | $Ir_{20}Rh_{80}$/C | Dimethyl carbonate | $NaClO_4$ | 55 |
| Example 30 | $Ir_{50}Rh_{50}$/C | Dimethyl carbonate | $NaClO_4$ | 60 |
| Example 31 | $Ir_{20}Ru_{80}$/C | Dimethyl carbonate | $NaClO_4$ | 53 |
| Example 32 | $Ir_{50}Ru_{50}$/C | Dimethyl carbonate | $NaClO_4$ | 59 |
| Example 33 | $Pd_{80}Ag_{20}$/C | Dimethyl carbonate | LiBr | 78 |
| Example 34 | $Pd_{50}Ag_{50}$/C | Dimethyl carbonate | LiBr | 81 |
| Example 35 | $Pd_{80}Au_{20}$/C | Dimethyl carbonate | LiBr | 84 |
| Example 36 | $Pd_{50}Au_{50}$/C | Dimethyl carbonate | LiBr | 88 |
| Example 37 | $Pd_{80}Ag_{20}$/C | Diphenyl carbonate | $NaClO_4$ | 66 |
| Example 38 | $Pd_{50}Ag_{50}$/C | Diphenyl carbonate | $NaClO_4$ | 72 |
| Example 39 | $Pd_{80}Au_{20}$/C | Diphenyl carbonate | $NaClO_4$ | 68 |
| Example 40 | $Pd_{50}Au_{50}$/C | Diphenyl carbonate | $NaClO_4$ | 77 |
| Comparative Example 1 | Bulk Au | Dimethyl carbonate | $NaClO_4$ | 11 |
| Comparative Example 2 | Bulk Pd | Dimethyl carbonate | $NaClO_4$ | 13 |

\* In the column of catalyst in Table 1, the numerical value described on the right side of a metal represents the content of the metal (mol %).

As shown in Table 1, in each of Examples, the catalyst obtained by mixing a metal sulfate and porous carbon and heat-treating the mixture was provided with an active particle containing a metal element and a porous carbon supporting the active particle. Use of such a catalyst enabled an organic carbonate to be electrochemically synthesized from carbon monoxide and an alcohol-based compound at a high selectivity.

In contrast, in each of Comparative Examples, use of the catalyst composed of metal only to synthesize an organic carbonate from carbon monoxide and an alcohol-based compound resulted in insufficient selectivity.

REFERENCE SIGNS LIST 10, 20: CELL FOR SYNTHESIZING ORGANIC CARBONATE
11: ANODE (ELECTRODE FOR SYNTHESIZING ORGANIC CARBONATE)
12: CATHODE

13: ION EXCHANGE MEMBRANE
14: MEMBRANE ELECTRODE ASSEMBLY
15: ANODE COMPARTMENT
15: CATHODE COMPARTMENT
15A, 16A: INLET PORT
15B, 16B: OUTLET PORT
19: POWER SOURCE
21: ELECTROCHEMICAL BATH
22: ELECTROLYTE SOLUTION

The invention claimed is:

1. A method for producing an organic carbonate, comprising electrochemically synthesizing an organic carbonate from carbon monoxide with an organic carbonate synthesis catalyst,
wherein the organic carbonate synthesis catalyst comprises an active particle comprising a metal element; and a porous carbon supporting the active particle,
wherein the metal element is Au, and at least one additional element selected from the group consisting of Fe, Co, Ni, Cu, Ti, Mn, Zn, Pd, and Ir.

2. The method for producing an organic carbonate according to claim 1, wherein carbon dioxide is converted to the carbon monoxide and the organic carbonate is electrochemically synthesized from the carbon monoxide.

3. The method for producing an organic carbonate according to claim 2, wherein the carbon dioxide is obtained from exhaust gas from any one of a power plant, an ironworks, a cement plant, and a waste incineration plant.

4. A method for producing an organic carbonate, comprising electrochemically synthesizing an organic carbonate from carbon monoxide with an organic carbonate synthesis catalyst,
wherein the organic carbonate synthesis catalyst comprises an active particle comprising a metal element; a component derived from a nitrogen-containing aromatic compound; and a porous carbon supporting the active particle, and
wherein the metal element is at least one selected from the group consisting of Fe, Co, Ni, Cu, Ag, Au, Ti, Mn, Zn, Pd, and Ir.

5. The method for producing an organic carbonate according to claim 4, wherein the nitrogen-containing aromatic compound is at least one selected from the group consisting of a pyridine derivative, an imidazole derivative, and a pyrazole derivative.

6. The method for producing an organic carbonate according to claim 1, wherein the organic carbonate synthesis catalyst is obtained by mixing a metal precursor and a porous carbon and heat-treating the mixture at 150° C. or more and 800° C. or less.

7. The method for producing an organic carbonate according to claim 1, wherein the organic carbonate is electrochemically synthesized from the carbon monoxide by using an electrode comprising the organic carbonate synthesis catalyst.

8. The method for producing an organic carbonate according to claim 7, wherein the organic carbonate is electrochemically synthesized from the carbon monoxide in a cell comprising the electrode.

9. The method for producing an organic carbonate according to claim 8, wherein the cell further comprises an electrolyte solution comprising a redox species.

10. The method for producing an organic carbonate according to claim 8, wherein the cell further comprises:
an anode compartment comprising the electrode therein and an alcohol-based compound therein; and
an inlet port through which the carbon monoxide is supplied to the anode compartment.

11. The method according to claim 1, wherein the metal element is Au, and at least one additional element selected from the group consisting of Pd and Ir.

12. A method for producing an organic carbonate, comprising electrochemically synthesizing an organic carbonate from carbon monoxide with an organic carbonate synthesis catalyst,
wherein the organic carbonate synthesis catalyst comprises an active particle comprising a metal element; and a porous carbon supporting the active particle,
wherein the metal element is Pd, and at least one additional element selected from the group consisting of Ti, Co, Ni, Cr, Mn, Fe, Cu, Zn, Ag, Au, and Sn.

13. The method according to claim 12, wherein the metal element is Pd, and at least one additional element selected from the group consisting of Ag and Cu.

* * * * *